United States Patent Office 3,564,496
Patented Feb. 16, 1971

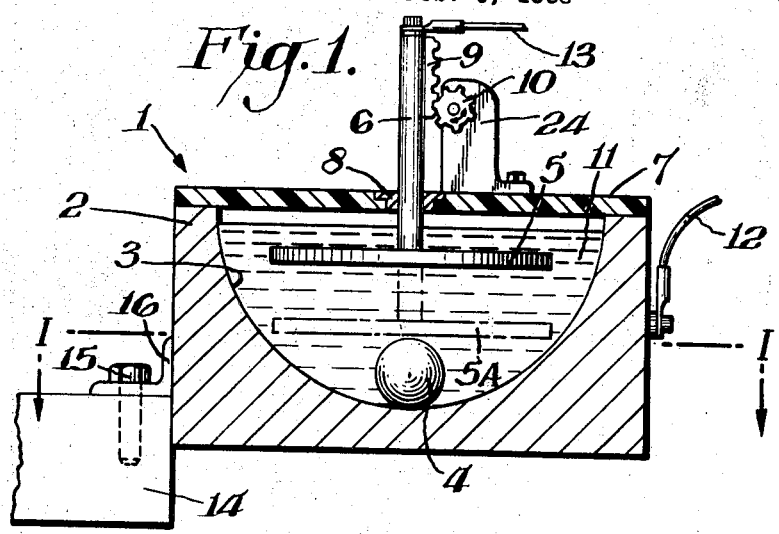
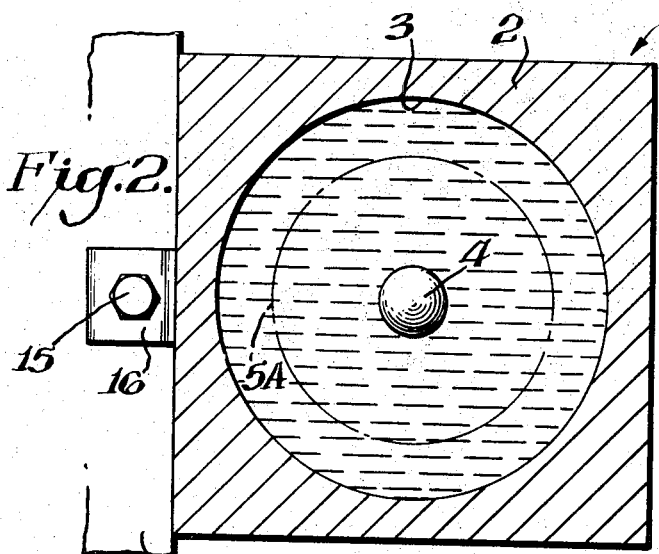
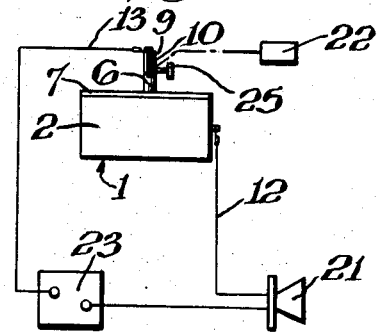
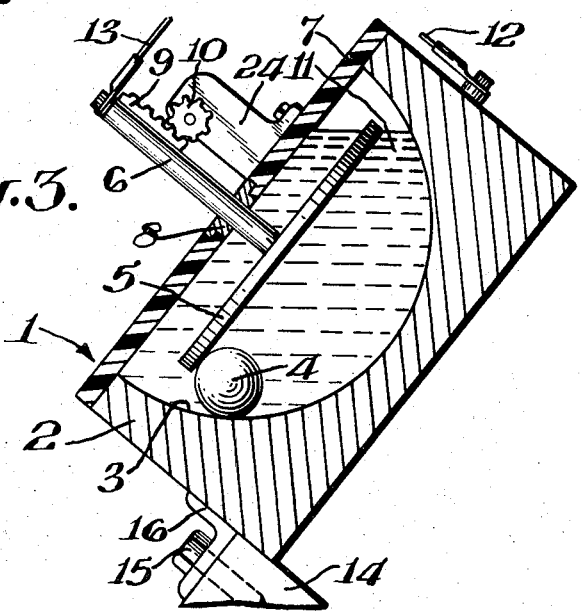

3,564,496
CRITICAL ROLL ANGLE WARNING DEVICE FOR VEHICLES
Alfred P. Brooks, West Orange, N.J., and Aldo P. Osti, Richmond Hill, N.Y., assignors to Chas. Pfizer & Co., Inc., New York, N.Y., a corporation of Delaware
Filed Feb. 5, 1968, Ser. No. 702,938
Int. Cl. H01h 35/02
U.S. Cl. 340—52                    7 Claims

ABSTRACT OF THE DISCLOSURE

Actuating switch comprising a cup-shaped lower contact in which a small, electrically-conductive ball rolls as the cup is displaced from the vertical and a horizontal upper contact which retains the ball within the cup, the upper contact being vertically movable manually or by electrical means in response to load and operating characteristics of the vehicle so as to vary the angle of actuation with a varying critical roll angle.

BACKGROUND OF THE INVENTION

This invention relates to a safety device for vehicles, in particular to a warning device which indicates approach of the vehicle toward its critical roll angle.

Vehicles, in particular off-the-road vehicles such as farm and construction equipment, are susceptible to serious overturn accidents when the vehicle reaches a certain angle. "Critical roll angle" is used herein to indicate that angle or inclination at which the vehicle will overturn. Accidents of this nature are responsible for extensive injury and loss of life yet these vehicles usually are not equipped with protective or warning devices to assist the operator. Several devices of this nature are known, for example Segoni Pat. 2,794,084, May 28, 1957, and Netterfield Pat. 2,926,223, Feb. 13, 1960. However, these devices have not found widespread use, in part due to their inability to adapt to changing characteristics of the vehicle. It is an object of this invention to provide a device which will warn the operator of a vehicle in which it is installed that the vehicle is dangerously close to an angle at which it will overturn. It is a further object of this invention to provide a warning device which will adjust the angle at which warning is provided in response to changing characteristics of the vehicle. In this way, the operator will be warned to correct or compensate in a manner to avoid the impending accident.

SUMMARY OF THE INVENTION

The warning device of this invention serves to indicate when a vehicle is approaching a critical roll angle at which the vehicle will overturn. It is actuated by the simultaneous engagement of two electrical contacts by a relatively small, electrically conductive ball which is situated in a cup-shaped depression provided on the upper surface of the lower electrical contact. The upper contact, which is horizontally disposed, is movable between a lower limit, at which it engages the ball or the lower contact, and an upper limit, the position of the upper contact being changeable either manually or in response to a signal derived from the loading and operating characteristics of the vehicle. The device resets itself automatically when the danger is averted.

REFERENCE TO DRAWINGS

For a better understanding of the instant invention, reference is made to the accompanying drawings, wherein FIG. 1 is a vertical cross-sectional view of one embodiment of a switch portion of this invention, FIG. 2 is a cross-sectional view of the embodiment of FIG. 1 taken along the line I—I, FIG. 3 is a view of the embodiment of FIG. 1 which is in an inclined position wherein the circuit is closed, and FIG. 4 is a schematic diagram of one embodiment of this invention employing the switch of FIGS. 1–3 in conjunction with an acoustic signalling device.

DETAILED DESCRIPTION OF THE INVENTION

Referring more specifically to the drawings, switch 1 has lower electrical contact 2 which is suitably constructed of electrically conductive metal with its upper surface forming a hemispherically-shaped cup 3. A metallic ball 4 of small diameter relative to that of cup 3 rests in cup 3 and is free to roll about as the device is displaced from the normally vertical position. Cup 3 contains inert, nonconductive liquid 11 which dampens the motion of ball 4. Upon sufficient displacement of the device from the vertical, ball 4 will simultaneously engage the lower contact 2 and upper electrical contact 5 to close the circut between cables 12 and 13, thereby actuating the acoustical signal device 21 of FIG. 4. The upper contact 5 is a horizontally-disposed disc, coaxial with the vertical axis of cup 3; the radius of upper contact 5 is smaller than that of cup 3 by an amount less than the diameter of ball 4. Upper contact 5 is dependent from metallic vertical shaft 10 which passes through a cover plate 7, made of rigid insulator material. Cover plate 7 is provided with bushing 8 through which shaft 6 passes. Shaft 6 is provided at its upper end with rack 9 which engages pinion gear 10. Pinion gear 10 is supported by bracket 24 and is driven manually by knob 25 or by servomotor 22 of FIG. 4, thereby changing the position of upper conact 5 with respect to lower contact 2. When contact 5 is at its lowest position 5A, it engages ball 4 resting at the bottom of cup 3, thereby closing the circuit between cables 12 and 13.

Switch 1 is rigidly attached to the vehicle 14 in a vertical position by means of a bolt 15 passing through bracket 16 which is attached to the switch 1. The switch is connected in an electrical circuit of FIG. 4 with acoustical signal device 21 and battery 23, by means of cables 12 and 13.

The servomotor 22 of FIG. 4 which drives pinion gear 10 is responsive to a signal derived from the loading and operating characteristics of the vehicle. In this manner, as the critical roll angle of the vehicle varies due to a change in these characteristics, the position of upper contact 5 is changed accordingly in order to alter the displacement required to actuate the device. The gross weight, load, position of a bucket or boom, etc. might be monitored by appropriate means familiar to those skilled in the art and signal derived from the total monitor system used to control the servomotor. Thus, as the vehicle becomes loaded and/or as a bucket is raised or boom extended, the angle at which the vehicle will overturn might decrease from 40° to 10°. The servomotor, which is responsive to one or more of these monitored characteristics, will lower the upper contact to a position which will cause the circuit to be closed at an angle less than 10°.

As the speed of the vehicle increases, the operator requires earlier warning of an approach to the critical roll angle if he is to have sufficient time to correct for the danger. The instant device provides for this by allowing the speed of the vehicle to be monitored and thereby be a factor in the positioning of the upper contact. As the speed of the vehicle increases, that contact moves lower so that the circuit will close at a smaller displacement from the vertical, thus providing the operator with sufficient warning to avoid the impending accident.

In a more comprehensive embodiment of the instant device, the upper contact at its lower limit of vertical movement engages either the ball or the lower contact, thereby affording a closed circuit even when the device is not displaced from the vertical. More preferably, the upper contact engages the ball at this extreme position of vertical movement. In this way, a warning will be provided when the vehicle is operated in a dangerous manner, regardless of the inclination of the vehicle. For example, the upper contact drops to its lower limit to prove warning in response to an excessive speed, overload or the like which constitutes dangerous operation of the vehicle even on level ground.

The cup-shaped depression provided by the upper surface of the lower contact is preferably an approximate hemisphere or ellipsoid in shape. A hemispherical depression is best used in conjunction with a disc-shaped upper contact which is coaxial with the vertical axis of the hemisphere. This arrangement provides a switch in which the circuit closes at the same displacement in all directions, that is, it will close upon the same degree of displacement from the vertical, whether the displacement is toward the front, rear or to the sides. In certain vehicles it will be preferred that the depression have an approximate elliptical cross section at all elevations, and the upper contact be correspondingly elliptical in shape. The inclination at which this arrangement will provide warning depends on the direction of the inclination; a greater angle is needed to actuate the device in the direction of the major axis of the ellipse. Therefore, on vehicles having a greater critical roll angle toward the front than toward the side, that is vehicles more susceptible to overturning toward the side than toward the front, such an arrangement can be used to advantage by installing the device with major axis of the ellipse aligned with the direction of forward motion of the vehicle. A more complex depression may be used to accommodate more closely the critical roll angle characteristics of any particular vehicle.

The ball which simultaneously engages the two contacts to close the circuit is of small radius relative to that of the depression and upper contact, is made of electrically-conductive material. A steel or copper ball is entirely suitable for most purposes, but it may be desirable for certain purposes that the ball have a hollow core or one of material different from that of the surface. For example, it may be desirable to fill the core with mercury or other heavy material to obtain a greater moment of inertia. In any event, it is only necessary that the surface of the ball be made of conductive material.

In order to dampen the motion of the ball so that it is not overly sensitive to the normal operation of the vehicle, a nonconductive liquid may be added to the depression, preferably enough to substantially fill the depression. Depending upon the degree of dampening desired, viscosity of the liquid might range from that of a non-viscous organic solvent to that of mineral oil or motor oil. The temperature range between the freezing and boiling points of the liquid should be sufficient that the liquid remain in that state at all reasonably expected operating temperatures. Also, the temperature dependence of viscosity is a factor to be considered in selecting the liquid. The liquid should be inert in the sense that it does induce oxidation or other reaction at the surface of the contacts or ball, thereby interfering with closing of the circuit when the ball simultaneously engages the two contacts. Likewise, the liquid should not be one which readily undergoes polymerization or which forms gums, and movement of the ball in response to displacement of the device from the vertical should be sufficient to disrupt any hydrodynamic film or other coating which may form on the contacts or on the ball. Mineral oil is one liquid which may be used in this invention.

It is required that the upper contact be of sufficient size so that the distance between the two contacts at all vertical positions of the upper contact is less than the diameter of the ball. The upper contact thus creates an enclosure for the ball within the depression and ensures that the ball is capable of simultaneously engaging both contacts as the device is tilted and that the ball will return automatically toward the bottom of the depression as the device returns to the vertical. The upper contact might simply take the form of a loop of wire or an annular disc which is at all points within the required distance from the surface of the depression. However, this contact will preferably take the form of a metallic plate or disc, usually situated coaxial with the vertical axis of the depression. Normally, the upper contact will be approximately of the same shape as the horizontal cross-section of the depression. If it is desired that the upper contact engage the ball when the contact is in its lowest vertical position, it is necessary that the radius of the upper contact be smaller than the radius of that horizontal cross section of the depression which is tangent to the ball resting in the foot of the depression. If it is desired that the upper contact directly engage the lower contact at its lowest position, the radius of the upper contact should be equal to or greater than the radius of that horizontal cross-section of the depression.

The upper contact might vary from a planar configuration if it is desired to retain a hemispherical depression yet still provide actuation at different angles depending upon the direction of the tilt. For example, the effect achieved by aforesaid combination of ellipsoidal depression and elliptical upper contact might also be achieved by the use of a hemispherical depression and elliptical upper contact, the ends of which are bent downward such that the top elevational view of the upper contact appears to be circular.

The lower contact may be connected to the circuit of the warning device directly by means of suitable electrical cables engaging the contact. However, the upper contact is most easily connected to the circuit through the means by which it is supported. Usually the support means will be comprised of a vertical shaft from which the contact is dependent. This shaft might be metallic and in electrical connection with the upper contact, in which event a cable connected to the upper end of the shaft will place the upper contact in the circuit. When the shaft is not electrically-conductive or is insulated from the upper contact, connection might be made by having an insulated cable pass through the length of the shaft to make direct connection with the upper contact itself. Inasmuch as the depression will usually have a cover to contain the dampening fluid and to keep dirt out of the system it is necessary to avoid short-circuiting the device through the cover, which will normally engage both contacts, either mediately or immediately. This might be accomplished by constructing the cover of nonconducting material, by employing a nonconducting gasket between the cover and lower contact, or similar means apparent to those skilled in the art.

The upper contact 5 of FIG. 1 is raised and lowered by means of rack 9 on shaft 6 and pinion gear 10, which is driven by knobs 25 or by servomotor 22 of FIG. 4. An alternative means for changing the position of the upper contact is provided by threading the shaft and bushing through which it passes, and rotating the threaded shaft by means of a belt driven by the servomotor. Other similar means for raising and lowering the upper contact will be adequate, including hand adjustment.

In addition to an acoustical signal device such as the vehicle's horn, warning might be provided by other signal means, such as a suitable light on the instrument panel of the vehicle. Also, the switch might be connected in a manner such that vehicle's ignition system is turned off upon the ball's simultaneously engaging the two contacts.

The warning device of this invention might be used to advantage in all vehicles and equipment in which warning of approach toward a critical angle is desirable. While farm and construction equipment provide obvious applications for use, others include all vehicles intended for off-the-road use and boats.

Various modifications and changes are contemplated and may be resorted to without departing from the function or scope of the invention hereinafter defined in the appended claims.

What is claimed is:

1. A safety device for vehicles comprising a lower electrical contact, a curved depression in the upper surface of said lower contact, a relatively small, movable, electrically-conductive ball resting in said depression, a horizontally-disposed upper electrical contact, movable support means mounting said upper contact upon said device for vertical movement relative to said depression, said upper contact having a perimeter such that the distance between the two contacts is less than the diameter of said ball at all positions of the upper contact whereby said ball is enclosed within said depression, means for adjusting the vertical position of said upper contact in accordance with the loading and operating characteristics of the vehicle, electrical circuit means including a warning device and said contacts, and said circuit being energized when the ball simultaneously engages the two contacts, whereby said device is actuated.

2. A safety device for vehicles as in claim 1 wherein said curved depression is approximately hemispherical.

3. A safety device for vehicles as in claim 1 wherein said depression contains a nonconductive liquid.

4. A switch for a vehicle safety device comprising a lower electrical contact; a curved depression in the upper surface of said lower contact; a relatively small, movable, electrically-conductive ball resting in the depression; a horizontally-disposed upper electrical contact; movable support means mounting said upper contact upon said switch for vertical movement relative to said depression, said upper contact having a perimeter such that the distance between the two contacts is less than the diameter of said ball at all positions of the upper contact whereby said ball is enclosed within said depression; and means for adjusting the vertical position of said upper contact in accordance with the loading and operating characteristics of the vehicle.

5. A switch as in claim 4 wherein said depression is approximately hemispherical.

6. A switch as in claim 4 wherein said depression contains a nonconductive liquid.

7. A switch as in claim 4 wherein said vertical shaft is provided with a longitudinally-disposed rack which engages a pinion gear mounted upon said switch.

References Cited

UNITED STATES PATENTS

| | | | |
|---|---|---|---|
| 1,662,979 | 3/1928 | Nelson | 200—61.52 |
| 1,915,267 | 6/1933 | Bigelow | 200—61.52 |
| 2,201,637 | 5/1940 | Soulat | 200—61.52 |
| 2,365,262 | 12/1944 | Gair | 200—61.52 |

ALVIN H. WARING, Primary Examiner

U.S. Cl. X.R.

200—61.45, 61.52